United States Patent
Chen et al.

(10) Patent No.: US 9,786,236 B2
(45) Date of Patent: Oct. 10, 2017

(54) LIQUID CRYSTAL PANELS AND THE DRIVING METHODS THEREOF

(71) Applicant: Shenzhen China Star Optoelectronics Technology Co., Ltd., Shenzhen, Guangdong (CN)

(72) Inventors: Cheng-hung Chen, Guangdong (CN); Jiali Jiang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 135 days.

(21) Appl. No.: 14/888,428

(22) PCT Filed: Oct. 21, 2015

(86) PCT No.: PCT/CN2015/092350
§ 371 (c)(1),
(2) Date: Oct. 31, 2015

(87) PCT Pub. No.: WO2017/054257
PCT Pub. Date: Apr. 6, 2017

(65) Prior Publication Data
US 2017/0162139 A1    Jun. 8, 2017

(51) Int. Cl.
*G09G 3/36* (2006.01)
*G09G 3/3275* (2016.01)
*G02F 1/1343* (2006.01)

(52) U.S. Cl.
CPC ......... *G09G 3/3614* (2013.01); *G09G 3/3275* (2013.01); *G09G 3/3685* (2013.01); *G02F 2001/134354* (2013.01); *G09G 2310/027* (2013.01)

(58) Field of Classification Search
CPC ............... G09G 3/3614; G09G 3/3275; G09G 2001/134354; G09G 2310/027
See application file for complete search history.

(56) References Cited

U.S. PATENT DOCUMENTS

| | | | |
|---|---|---|---|
| 8,040,447 B2 | 10/2011 | You et al. | |
| 2005/0206795 A1 | 9/2005 | Shin et al. | |
| 2006/0227095 A1 | 10/2006 | Kim et al. | |
| 2006/0250537 A1* | 11/2006 | Lee | G02F 1/13624 349/43 |

(Continued)

FOREIGN PATENT DOCUMENTS

CN    101281309 A    10/2008

*Primary Examiner* — Liliana Cerullo
(74) *Attorney, Agent, or Firm* — Andrew C. Cheng

(57) ABSTRACT

A liquid crystal panel and the driving method thereof are disclosed. The liquid crystal panel includes at least one storage electrode, a plurality of scanning lines, a plurality of data lines, and a plurality of pixel areas. Each of the pixel areas includes a pixel electrode, a first TFT and a second TFT. The first TFT drives the corresponding pixel electrode. The gate of the second TFT connects with the previous scanning line, and one of the source and the drain of the second TFT connects to the corresponding pixel electrode within the pixel area, and the other one connects with the storage electrode. In this way, the optimal common voltage is applied to the liquid crystal panel when the liquid crystal panel is in a displaying process, and thus the display performance is guaranteed.

8 Claims, 5 Drawing Sheets

(56) References Cited

U.S. PATENT DOCUMENTS

| | | |
|---|---|---|
| 2007/0035494 A1 | 2/2007 | Chang |
| 2007/0057888 A1 | 3/2007 | Lin et al. |
| 2007/0139331 A1 | 6/2007 | You |
| 2008/0067512 A1 | 3/2008 | Lee et al. |
| 2009/0284674 A1 | 11/2009 | Chang et al. |
| 2010/0171893 A1 | 7/2010 | Huang |
| 2015/0309380 A1 | 10/2015 | Xu |
| 2016/0163272 A1* | 6/2016 | Ishige .................. G09G 3/3607 345/694 |

* cited by examiner

LIQUID CRYSTAL PANELS AND THE DRIVING METHODS THEREOF

BACKGROUND OF THE INVENTION

1. Field of the Invention

The present disclosure relates to liquid crystal display technology, and more particularly to a liquid crystal panel and the driving method thereof.

2. Discussion of the Related Art

Liquid crystal panels display different pixel grayscales basing on a voltage difference between the common voltage (Vcom) and the grayscale voltage. To prevent the liquid crystal molecules from being polarized, the positive and the negative polarity of the grayscale voltage have to be inversed by alternated driving methods. The poor common voltage may affect the display performance of the liquid crystal panel, such as residual or flicker. Thus, before the liquid crystal panels enter the market, it is better to make sure the best common voltage has been applied. Conventionally, the detection process is performed by manual operations or by machine's automatic operations, which may increase the manufacturing cost and may reduce the productivity.

SUMMARY

The object of the invention is to provide a liquid crystal panel and the driving method thereof. With the configuration, the best common voltage may be applied to the liquid crystal panel when the liquid crystal panel is in a displaying process so as to guarantee the display performance.

In one aspect, a liquid crystal panel includes: at least one storage electrode, a plurality of scanning lines, a plurality of data lines, and a plurality of pixel areas arranged in a matrix defined by the scanning lines and the data lines, wherein each of the pixel areas includes a pixel electrode, a first thin film transistor (TFT) and a second TFT, a source of the first TFT connects to the corresponding data line, a drain of the first TFT connects to the corresponding pixel electrode, a gate of the first TFT connects to the corresponding scanning line, the sources of the first TFTs within the same column connect to the same data line, the gates of the first TFT within the same row connect to the same scanning line, the first TFT is configured for driving the pixel electrode within the corresponding pixel area, the gate of the second TFT connects with the previous scanning line, one of the source and the drain of the second TFT connects to the corresponding pixel electrode within the pixel area, and the other one connects with the storage electrode.

Wherein the liquid crystal panel is driven by driving methods including column inversion method, row inversion method, 2Line+1 driving method, and 2Line driving method.

Wherein the storage electrodes are bar-shaped, and the bar-shaped storage electrodes are parallel to the data lines.

Wherein the storage electrodes includes first storage electrodes and second storage electrodes, and the first storage electrodes and the second storage electrodes are bar-shaped, the first storage electrodes are parallel to the scanning lines, and the second storage electrodes are parallel to the data lines, the first storage electrodes intersect with the second storage electrodes, and the first storage electrodes are insulated from the second storage electrodes.

Wherein the liquid crystal panel further includes peripheral wirings, when the liquid crystal panel is of a vertical electrical field mode, the peripheral wirings connects the storage electrode and a common electrode on a color film substrate of the liquid crystal panel.

Wherein the liquid crystal panel further includes peripheral wirings, when the liquid crystal panel is of a horizontal electrical field mode, the storage electrodes are connected by the peripheral wirings.

Wherein the number of the first storage electrodes is the same with the numbers of the second storage electrodes and the pixel electrodes.

Wherein the liquid crystal panel further includes a gate driver and a data driver, the scanning lines connect with the gate driver, and the data lines connect with the data driver, the gate driver provides gate driving signals to the scanning lines in sequence to turn on the first TFT and the second TFT corresponding to the scanning lines, the data driver provides grayscale driving signals to the data lines such that the grayscale driving signals are applied to the pixel electrodes via the first TFT, and the grayscale driving signals applied to the pixel electrode is further applied to the storage electrode via the second TFT when the liquid crystal panel displays the previous frame.

In another aspect, A driving method of liquid crystal panels includes: receiving gate driving signals from the scanning lines and turning on the first TFT and the second TFT corresponding to the scanning lines; and receiving grayscale driving signals from the data lines such that the grayscale driving signals are applied to the pixel electrodes via the first TFT, and the grayscale driving signals applied to the pixel electrode is further applied to the storage electrode via the second TFT when the liquid crystal panel displays the previous frame.

In another aspect, a liquid crystal panel, includes: at least one storage electrode, a plurality of scanning lines, a plurality of data lines, and a plurality of pixel areas arranged in a matrix defined by the scanning lines and the data lines, wherein each of the pixel areas includes a pixel electrode, a first thin film transistor (TFT) and a second TFT, a source of the first TFT connects to the corresponding data line, a drain of the first TFT connects to the corresponding pixel electrode, a gate of the first TFT connects to the corresponding scanning line, the sources of the first TFTs within the same column connect to the same data line, the gates of the first TFT within the same row connect to the same scanning line, the first TFT is configured for driving the pixel electrode within the corresponding pixel area, the gate of the second TFT connects with the previous scanning line, one of the source and the drain of the second TFT connects to the corresponding pixel electrode within the pixel area, and the other one connects with the storage electrode, the storage electrodes includes first storage electrodes and second storage electrodes, and the first storage electrodes and the second storage electrodes are bar-shaped, the first storage electrodes are parallel to the scanning lines, and the second storage electrodes are parallel to the data lines, the first storage electrodes intersect with the second storage electrodes, and the first storage electrodes are insulated from the second storage electrodes, wherein the liquid crystal panel further comprises peripheral wirings, when the liquid crystal panel is of a vertical electrical field mode, the peripheral wirings connects the storage electrode and a common electrode on a color film substrate of the liquid crystal panel, and wherein the number of the first storage electrodes is the same with the numbers of the second storage electrodes and the pixel electrodes.

In view of the above, each of the pixel areas includes two TFTs, wherein one TFT applies the grayscale driving signals to the pixel electrode, and the other one stored the grayscale driving signals applied to the pixel electrode when the previous frame is displayed. As the positive polarity and the negative polarity of the grayscale driving signals (grayscale voltage) is inversed, the common voltage corresponding to two adjacent frames may be balanced. As such, the optimal common voltage is obtained to guarantee the display performance. Manual operations or machine's automatic operations are not needed in the present configuration, and thus the manufacturing cost is decreased and the productivity is ensured.

BRIEF DESCRIPTION OF THE DRAWINGS

FIG. 4 is a schematic view showing the 2line+1 driving method of the liquid crystal panel in accordance with one embodiment.

DETAILED DESCRIPTION OF THE EMBODIMENTS

Embodiments of the invention will now be described more fully hereinafter with reference to the accompanying drawings, in which embodiments of the invention are shown.

Figure 1:
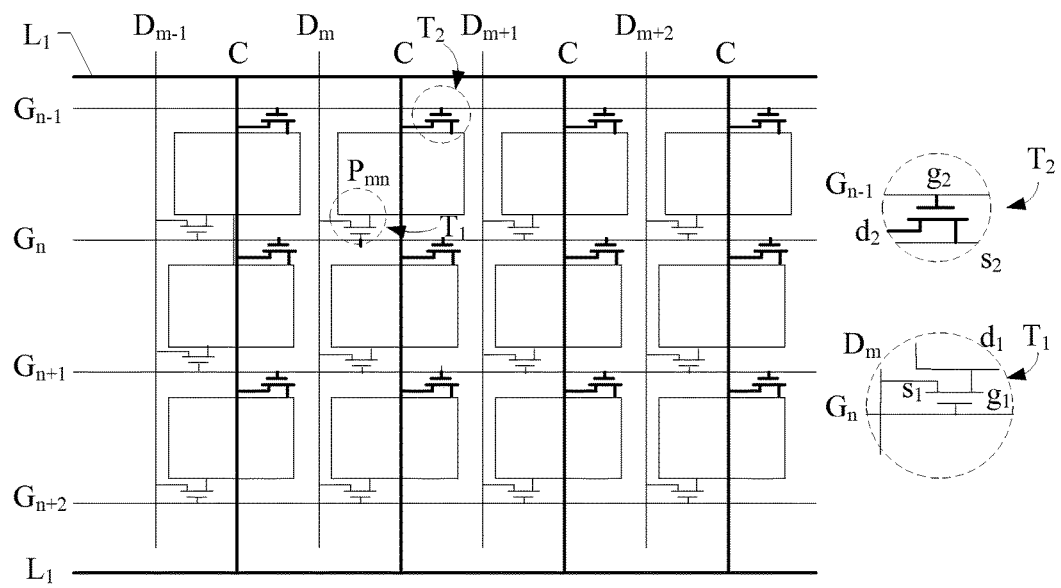
FIG. 1 is a schematic view of the liquid crystal panel in accordance with a first embodiment.
Figure 2:
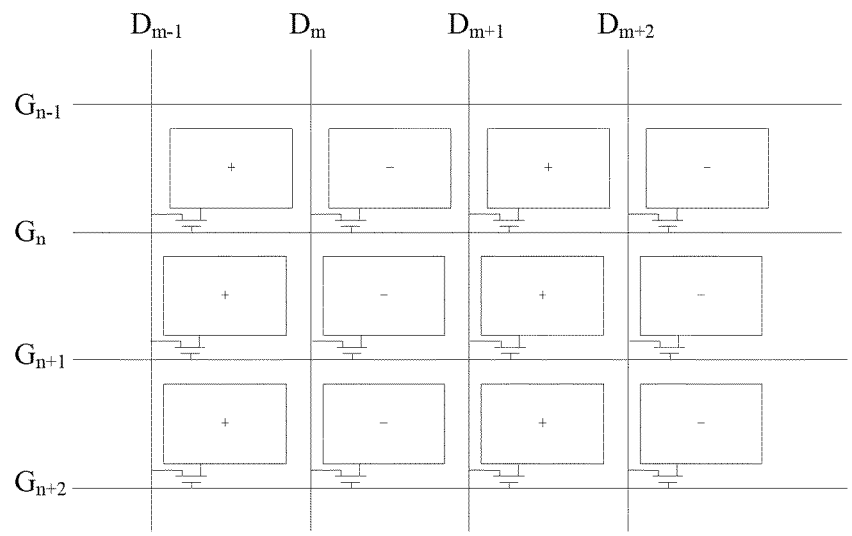
FIG. 2 is a schematic view of the column inversion driving method of the liquid crystal panel in accordance with one embodiment.
Figure 3:
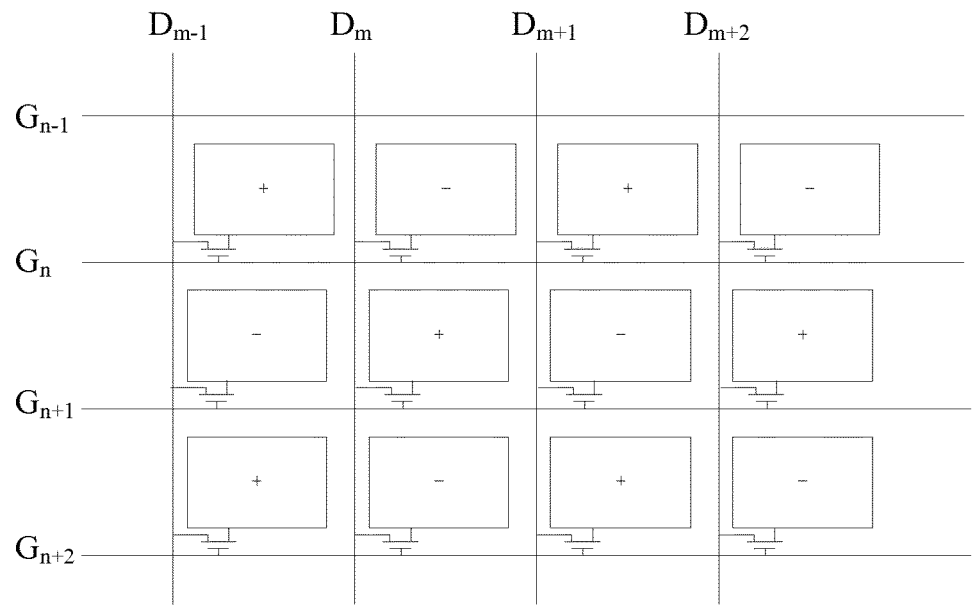
FIG. 3 is a schematic view of the dot inversion driving method of the liquid crystal panel in accordance with one embodiment.
Figure 4:
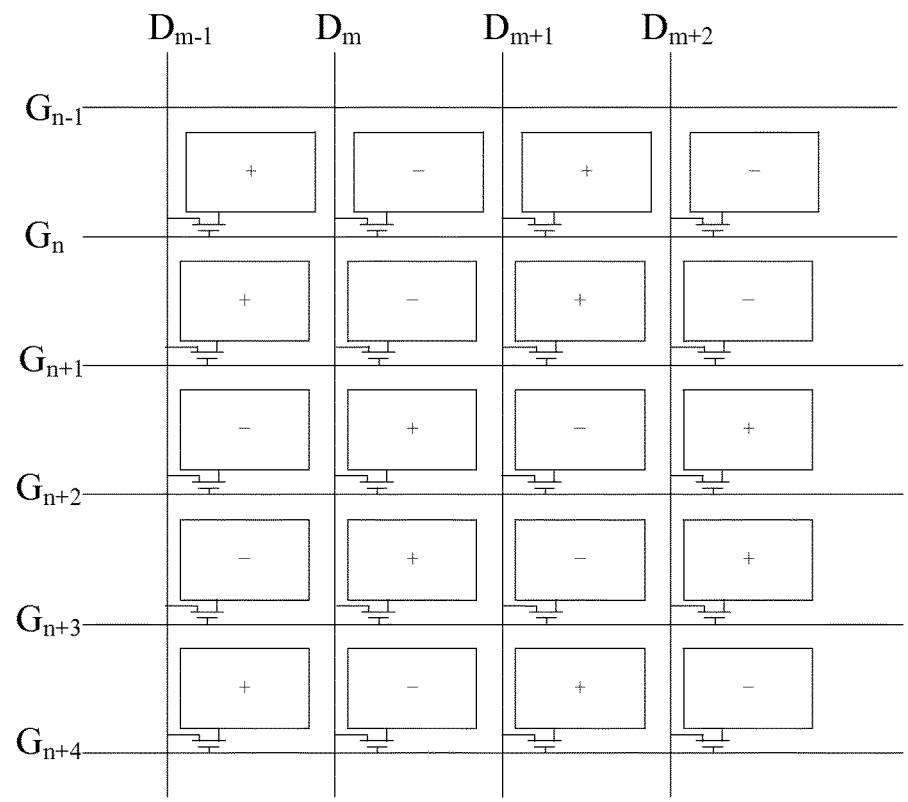
FIG. 4 is a schematic view showing the 2line driving method of the liquid crystal panel in accordance with one embodiment.
Figure 5:
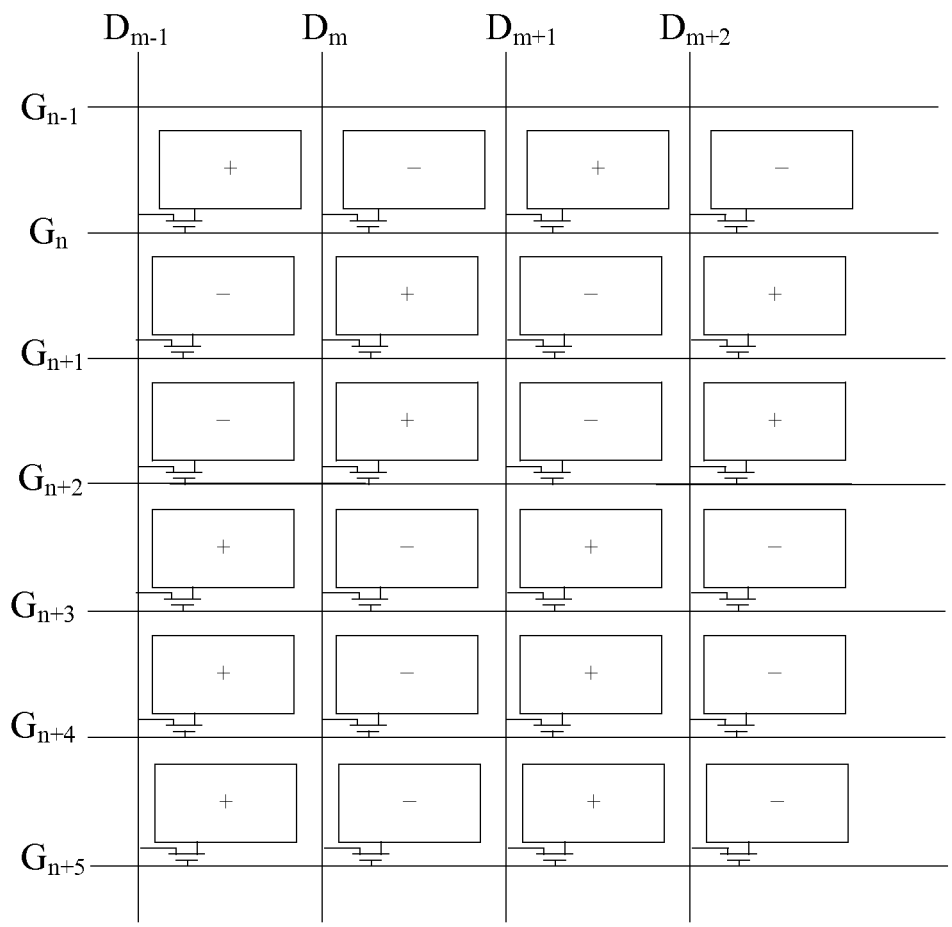

FIG. 1 is a schematic view of the liquid crystal panel in accordance with a first embodiment. As shown in FIG. 1, the liquid crystal panel includes a plurality of scanning lines ($G_1 \ldots G_{n-1}, G_n, G_{n+1}, G_{n+2}$) parallel to each other, a plurality of data lines ($D_1 \ldots D_{m-1}, D_m, D_{m+1}, D_{m+2}$) parallel to each other, and a plurality of pixel areas arranged in a matrix. The data lines intersect with the scanning lines, and the data lines are insulated with the scanning lines. The pixel areas are defined by the scanning lines ($G_1 \ldots G_{n-1}, G_n, G_{n+1}, G_{n+2}$) and the data lines ($D_1 \ldots D_{m-1}, D_m, D_{m+1}, D_{m+2}$). For instance, the scanning line ($G_n$) intersects with the data line ($D_m$) to define one pixel area ($P_{mn}$). The pixel area ($P_{mn}$) includes a pixel electrode correspondingly connects to the scanning line ($G_n$) and data line ($D_m$), wherein m and n are positive integer.

Each of the pixel area further includes two thin film transistors (TFTs) including a first TFT ($T_1$) and a second TFT ($T_2$). The first TFT ($T_1$) is configured for driving the pixel electrode to display images, which is equivalent to the only one TFT within each of the pixel areas within the conventional configuration. In the embodiment, the second TFT ($T_2$) is configured within each of the pixel areas. For instance, the gate ($g_1$) of the first TFT ($T_1$) within the pixel area ($P_{mn}$) connects to the scanning line ($G_n$), the source ($s_1$) connects to the data line ($D_m$), and the drain ($d_1$) connects to the pixel electrode. The source of the first TFTs ($T_1$) within the same column connect to the same data line, such as data line ($D_m$), the gate of the first TFT ($T_1$) within the same row connects to the same scanning line, such as the scanning line ($G_n$). The gate ($g_2$) of the second TFT ($T_2$) connects to the previous scanning line ($G_{n-1}$), the source ($s_2$) connects to the pixel electrode within the pixel area ($P_{mn}$), the drain ($d_2$) connects to the storage capacitor (C) of the liquid crystal panel. In addition, the drain ($d_2$) of the second TFT ($T_2$) may connect to the pixel electrode within the pixel area ($P_{mn}$), and the source ($s_2$) may connect to the storage capacitor (C) of the liquid crystal panel.

The storage capacitor (C) is arranged on the array substrate of the liquid crystal panel, and the storage capacitor (C) is insulated from the pixel electrode so as to form the capacitor with the pixel electrode for temporarily storing the grayscale voltage of the previous frame. In the embodiment, the storage capacitor (C) is bar-shaped. The plurality of bar-shaped storage capacitors (C) parallel to the data lines ($D_1 \ldots D_{m-1}, D_m, D_{m+1}, D_{m+2}$) and correspond to the data lines one by one. That is, the storage capacitor (C) connected with the drain ($d_2$) of the second TFT ($T_2$) within the pixel area ($P_{mn}$) corresponds to the data line ($D_m$), and the bar-shaped storage capacitors (C) are connected by peripheral wiring ($L_1$).

During the displaying process, the scanning line ($G_1 \ldots G_{n-1}, G_n, G_{n+1}, G_{n+2}$) connects to a gate driver of the liquid crystal panel to receive the gate driving signals provided to the scanning lines in sequence from the gate driver. As such, the first TFT ($T_1$) and the second TFT ($T_2$) corresponding to the scanning lines are turned on. The data lines ($D_1 \ldots D_{m-1}, D_m, D_{m+1}, D_{m+2}$) connect to the data driver of the liquid crystal panel to receive the grayscale driving signals provided by the data driver. As shown in FIGS. 2 to 5, the driving methods of the liquid crystal panel may include column inversion method, row inversion method, 2Line+1 driving method, and 2Line driving method. The details of the above driving methods are omitted hereinafter.

When the scanning line ($G_{n-1}$) receives the gate driving signals (high level), the second TFT ($T_2$) within the pixel area ($P_{mn}$) is turned on such that the grayscale voltage of the previous frame stored in the corresponding capacitor of the pixel area ($P_{mn}$) is transmitted to the storage capacitor (C). Similarly, when the scanning line ($G_n$) receives the gate driving signals, the grayscale voltage is transmitted to the storage capacitor (C) via the second TFT ($T_2$) of the pixel area ($P_{mn}$). As the grayscale voltage is driven by alternately inversion of the positive and negative polarity, the grayscale voltage stored in the capacitors formed by the pixel electrode connected with the corresponding scanning line ($G_n$) and the storage capacitor (C) may include positive polarity and negative polarity, wherein the grayscale voltage stored by the capacitors constitutes the common voltage of the liquid crystal panel in a displaying process. In this way, the common voltage may be optimal, that is, balance in its positive and negative sides. Compared to the conventional solution, manual operations or machine's automatic operations are not needed in the present configuration, and thus the manufacturing cost is decreased and the productivity is ensured.

With respect to the vertical alignment (VA) LCDs, a vertical electrical field has to be applied in a displaying process. That is, the electrical field formed by the voltage difference between the common voltage on the color film substrate and the grayscale voltage on the array substrate. Thus, the grayscale voltage stored by the capacitors has to be transmitted to the common electrode on the color film substrate. Specifically, a peripheral wirings may connect to the peripheral wiring ($L_1$) to connect with the storage capacitor (C) and the common electrode on the color film substrate.

With respect to the Fringe Field Switching (FFS) and In-plane switching (IPS) liquid crystal panels, the horizontal electrical field, which is formed by the voltage difference between the grayscale voltage stored by the capacitors and the grayscale voltage received by the pixel electrode, has to be applied. That is, the peripheral wirings is adopted to connect the peripheral wiring ($L_1$). Thus, the grayscale voltage stored by the capacitors has not to be transmitted to the common electrode on the color film substrate.

Figure 6:
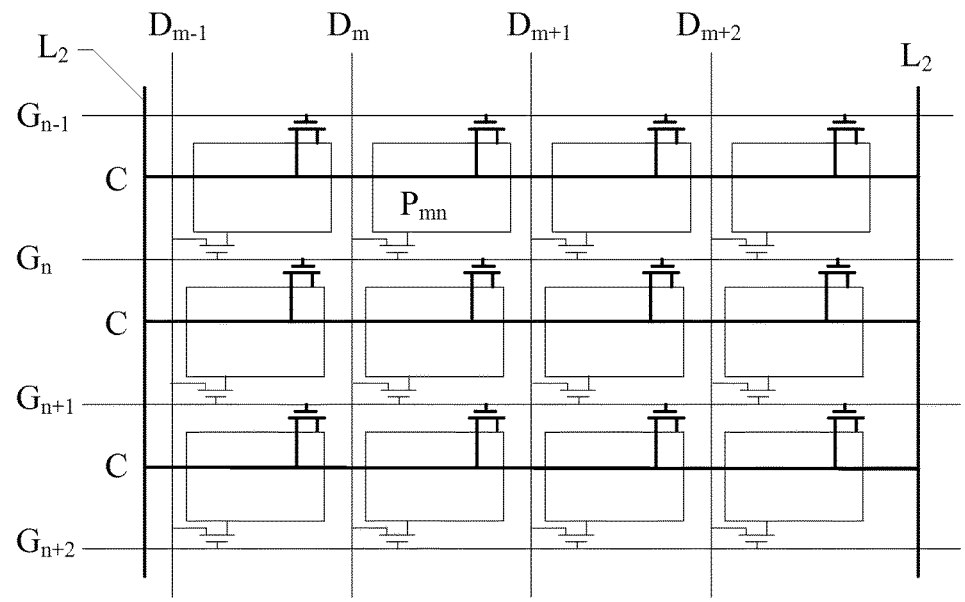
FIG. 6 is a schematic view of the liquid crystal panel in accordance with a second embodiment.

FIG. 6 is a schematic view of the liquid crystal panel in accordance with a second embodiment. To simply the descriptions, the components in the second embodiment that are the same with the first embodiment are marked by the same reference numerals, and thus only the differences between the first embodiment and the second embodiment will be described hereinafter. As shown in FIG. 6, the plurality of bar-shaped storage capacitors (C) are parallel to the data lines ($D_1 \ldots D_{m-1}, D_m, D_{m+1}, D_{m+2}$), and the bar-shaped storage capacitor (C) are connected via the peripheral wiring ($L_2$). In the embodiment, the operation principles of the liquid crystal panel are the same with the first embodiment. Regarding the VA liquid crystal panel, the grayscale voltage stored by the capacitors is transmitted to the common electrode on the color film substrate via the peripheral wirings connecting the peripheral wiring ($L_2$). Regarding the IPS liquid crystal panel, it is not necessary to transmit the grayscale voltage stored by the capacitors to the common electrode on the color film substrate by adopting the peripheral wiring to connect the peripheral wiring ($L_2$).

Figure 7:
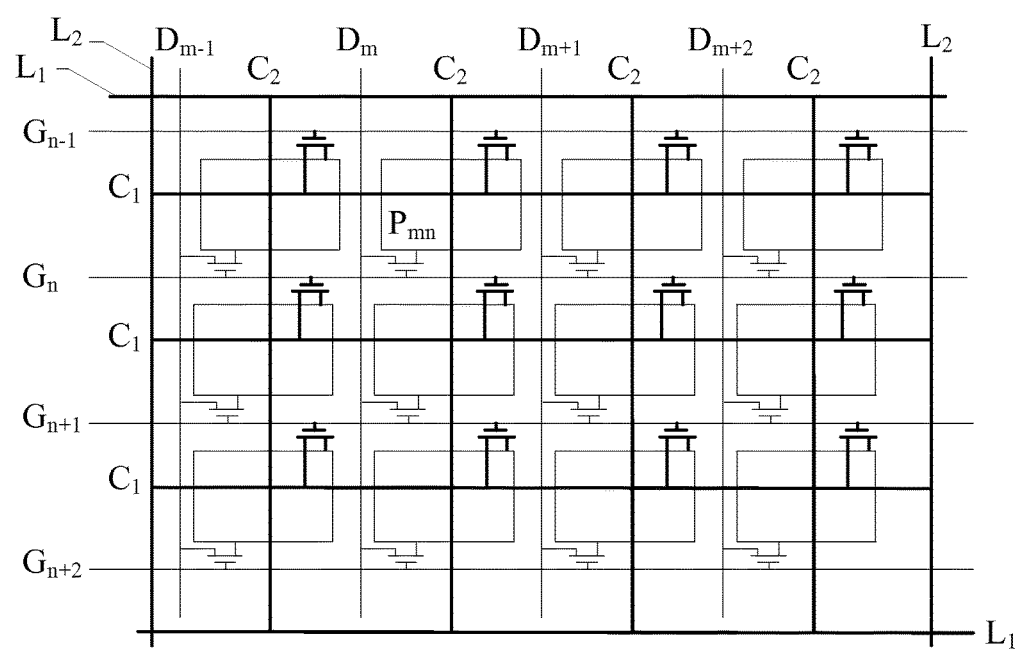
FIG. 7 is a schematic view of the liquid crystal panel in accordance with a third embodiment.

FIG. 7 is a schematic view of the liquid crystal panel in accordance with a third embodiment. To simply the descriptions, the components in the second embodiment that are the same with the first embodiment are marked by the same reference numerals, and thus only the differences between the third embodiment and the first and the second embodiment will be described hereinafter. As shown in FIG. 7, the storage capacitors (C) include bar-shaped first capacitors ($C_1$) and second capacitor ($C_2$). The first capacitors ($C_1$) are parallel to the scanning lines ($G_1 \ldots G_{n-1}, G_n, G_{n+1}, G_{n+2}$), and the second capacitor ($C_2$) are parallel to the data lines ($D_1 \ldots D_{m-1}, D_m, D_{m+1}, D_{m+2}$). The first capacitors ($C_1$) intersect with the second capacitor ($C_2$), and the first capacitors ($C_1$) are insulated from the second capacitor ($C_2$). In the embodiment, the operation principles of the liquid crystal panel are the same with the first embodiment. Regarding the VA liquid crystal panel, the grayscale voltage stored by the capacitors is transmitted to the common electrode on the color film substrate via the peripheral wiring connecting the peripheral wiring ($L_1$). In addition, another peripheral wiring is adopted to connect the peripheral wiring ($L_2$) to transmit the grayscale voltage stored in the capacitors to the common electrode on the color film substrate. The peripheral wiring ($L_1$) is insulated from the peripheral wiring ($L_2$).

Regarding the IPS liquid crystal panel, the peripheral wirings are needed to connect the peripheral wiring ($L_1$) and the peripheral wiring ($L_2$), and it is not necessary to transmit the grayscale voltage stored by the capacitors to the common electrode on the color film substrate by the peripheral wiring ($L_1$) and the peripheral wiring ($L_2$).

Figure 8:
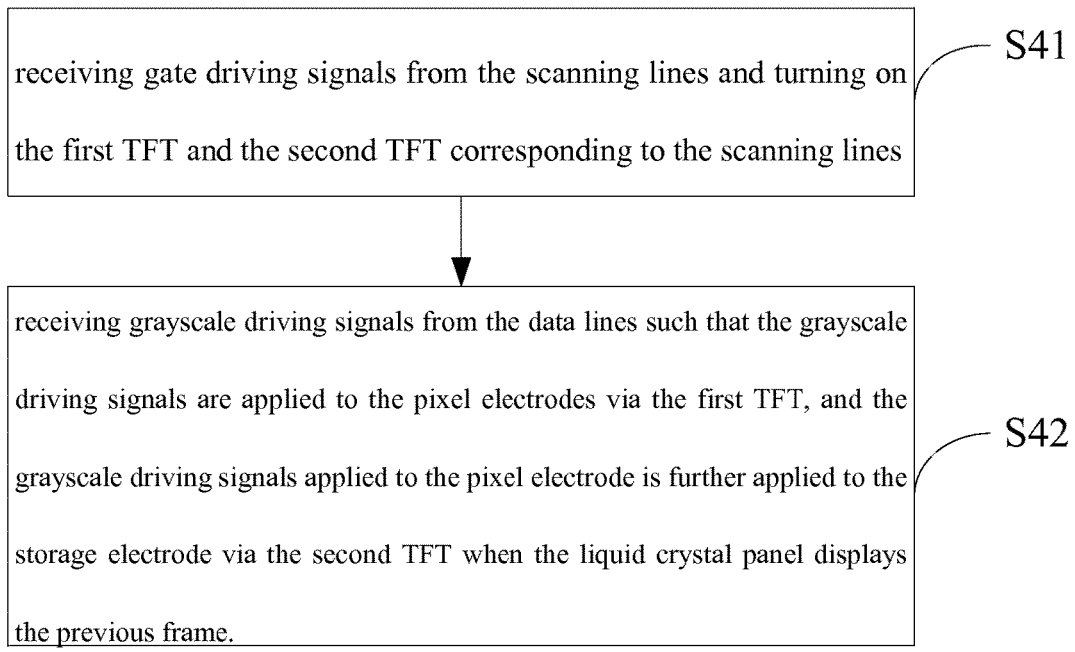
FIG. 8 is a flowchart illustrating the driving method of the liquid crystal panel in accordance with one embodiment.

FIG. 8 is a flowchart illustrating the driving method of the liquid crystal panel in accordance with one embodiment. As shown in FIG. 8, the method includes the following steps.

In block S41, the scanning lines receive the gate driving signals to turn on the first TFT ($T_1$) and the second TFT ($T_2$) corresponding to each of the scanning lines.

In block S42, the data lines receive the grayscale driving signals such that the grayscale driving signals are applied to the pixel electrode via the first TFT ($T_1$). In addition, before the previous frame is displayed, the grayscale driving signals applied to the pixel electrode are applied to the storage electrode via the second TFT ($T_2$).

The details regarding the transmission of the grayscale signals between the first TFT ($T_1$) and the second TFT ($T_2$) and how the storage electrodes process the applied grayscale driving signals may be referenced in the above embodiments.

In view of the above, each of the pixel areas includes two TFTs, wherein one TFT applies the grayscale driving signals to the pixel electrode, and the other one stored the grayscale driving signals applied to the pixel electrode when the previous frame is displayed. As the positive polarity and the negative polarity of the grayscale driving signals (grayscale voltage) is inversed, the common voltage corresponding to two adjacent frames may be balanced. As such, the optimal common voltage is obtained to guarantee the display performance. Manual operations or machine's automatic operations are not needed in the present configuration, and thus the manufacturing cost is decreased and the productivity is ensured.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal panel, comprising:
    at least one storage electrode, a plurality of scanning lines, a plurality of data lines, and a plurality of pixel areas arranged in a matrix defined by the scanning lines and the data lines, wherein each of the pixel areas comprises a pixel electrode, a first thin film transistor (TFT) and a second TFT, a source of the first TFT connects to the corresponding data line, a drain of the first TFT connects to the corresponding pixel electrode, a gate of the first TFT connects to the corresponding scanning line, the sources of the first TFTs within the same column connect to the same data line, the gates of the first TFT within the same row connect to the same scanning line, the first TFT is configured for driving the pixel electrode within the corresponding pixel area, the gate of the second TFT connects with the previous scanning line, one of the source and the drain of the second TFT connects to the corresponding pixel electrode within the pixel area, and the other one connects with the storage electrode; and
    wherein the storage electrodes comprises first storage electrodes and second storage electrodes, and the first storage electrodes and the second storage electrodes are bar-shaped, the first storage electrodes are parallel to the scanning lines, and the second storage electrodes are parallel to the data lines, the first storage electrodes intersect with the second storage electrodes, and the first storage electrodes are insulated from the second storage electrodes.

2. The liquid crystal panel as claimed in claim 1, wherein the liquid crystal panel is driven by driving methods including column inversion method, row inversion method, 2Line+1 driving method, and 2Line driving method.

3. The liquid crystal panel as claimed in claim 1, wherein the liquid crystal panel further comprises peripheral wirings, when the liquid crystal panel is of a vertical electrical field mode, the peripheral wirings connects the storage electrode and a common electrode on a color film substrate of the liquid crystal panel.

4. The liquid crystal panel as claimed in claim 1, wherein the liquid crystal panel further comprises peripheral wirings, when the liquid crystal panel is of a horizontal electrical field mode, the storage electrodes are connected by the peripheral wirings.

5. The liquid crystal panel as claimed in claim 1, wherein the number of the first storage electrodes is the same with the numbers of the second storage electrodes and the pixel electrodes.

6. The liquid crystal panel as claimed in claim 5, wherein the liquid crystal panel further comprises a gate driver and a data driver, the scanning lines connect with the gate driver, and the data lines connect with the data driver, the gate driver provides gate driving signals to the scanning lines in sequence to turn on the first TFT and the second TFT corresponding to the scanning lines, the data driver provides grayscale driving signals to the data lines such that the grayscale driving signals are applied to the pixel electrodes via the first TFT, and the grayscale driving signals applied to the pixel electrode is further applied to the storage electrode via the second TFT when the liquid crystal panel displays the previous frame.

7. A driving method of liquid crystal panels, the liquid crystal panel comprises at least one storage electrode, a plurality of scanning lines, a plurality of data lines, and a plurality of pixel areas arranged in a matrix defined by the scanning lines and the data lines, wherein each of the pixel areas comprises a pixel electrode, a first TFT and a second TFT, a source of the first TFT connects to the corresponding data line, a drain of the first TFT connects to the corresponding pixel electrode, a gate of the first TFT connects to the corresponding scanning line, the sources of the first TFTs within the same column connect to the same data line, the gates of the first TFT within the same row connect to the same scanning line, the first TFT is configured for driving the pixel electrode within the corresponding pixel area, the gate of the second TFT connects with the previous scanning line, one of the source and the drain of the second TFT connects to the corresponding pixel electrode within the pixel area, and the other one connects with the storage electrode, the driving method comprises:

receiving gate driving signals from the scanning lines and turning on the first TFT and the second TFT corresponding to the scanning lines; and receiving grayscale driving signals from the data lines such that the grayscale driving signals are applied to the pixel electrodes via the first TFT, and the grayscale driving signals applied to the pixel electrode is further applied to the storage electrode via the second TFT when the liquid crystal panel displays the previous frame.

8. A liquid crystal panel, comprising:

at least one storage electrode, a plurality of scanning lines, a plurality of data lines, and a plurality of pixel areas arranged in a matrix defined by the scanning lines and the data lines, wherein each of the pixel areas comprises a pixel electrode, a first thin film transistor (TFT) and a second TFT, a source of the first TFT connects to the corresponding data line, a drain of the first TFT connects to the corresponding pixel electrode, a gate of the first TFT connects to the corresponding scanning line, the sources of the first TFTs within the same column connect to the same data line, the gates of the first TFT within the same row connect to the same scanning line, the first TFT is configured for driving the pixel electrode within the corresponding pixel area, the gate of the second TFT connects with the previous scanning line, one of the source and the drain of the second TFT connects to the corresponding pixel electrode within the pixel area, and the other one connects with the storage electrode, the storage electrodes comprises first storage electrodes and second storage electrodes, and the first storage electrodes and the second storage electrodes are bar-shaped, the first storage electrodes are parallel to the scanning lines, and the second storage electrodes are parallel to the data lines, the first storage electrodes intersect with the second storage electrodes, and the first storage electrodes are insulated from the second storage electrodes, wherein the liquid crystal panel further comprises peripheral wirings, when the liquid crystal panel is of a vertical electrical field mode, the peripheral wirings connects the storage electrode and a common electrode on a color film substrate of the liquid crystal panel, and wherein the number of the first storage electrodes is the same with the numbers of the second storage electrodes and the pixel electrodes.

* * * * *